United States Patent [19]

Fogt

[11] 3,930,380
[45] Jan. 6, 1976

[54] ICE DISPENSER CONTAINER COUPLING

[75] Inventor: Thomas H. Fogt, West Carrollton, Ohio

[73] Assignee: General Motors Corporation, Detroit, Mich.

[22] Filed: Aug. 19, 1974

[21] Appl. No.: 498,755

[52] U.S. Cl. .................. 64/15 C; 64/27 R; 185/45; 403/229; 64/30 R
[51] Int. Cl.² .......................................... F12D 3/52
[58] Field of Search ...... 64/15 C, 15 R, 27 C, 27 R, 64/27 S, 30 R, 30 E, 4; 403/229; 185/45

[56] References Cited
UNITED STATES PATENTS

| | | | |
|---|---|---|---|
| 1,621,428 | 3/1927 | Pedersen et al. | 64/15 C |
| 2,254,566 | 9/1941 | Cornell, Jr. | 64/15 C |
| 2,420,462 | 5/1947 | Carr | 64/15 C |
| 2,616,274 | 11/1952 | Landrum | 64/27 C |
| 2,680,383 | 6/1954 | Lahti | 64/15 C |
| 3,038,322 | 6/1962 | Wilson | 64/15 R |
| 3,529,440 | 9/1970 | Bauer | 64/27 R |

*Primary Examiner*—Samuel Scott
*Assistant Examiner*—Randall Heald
*Attorney, Agent, or Firm*—Edward P. Barthel

[57] ABSTRACT

A self-aligning shaft coupling in which an open coil, helical spring is carried by a flanged disc on a driven shaft for releasable coupling within a housing mounted on a driving shaft wherein the shaft may be in axial or offset misalignment. The housing has a cylindrical internal peripheral surface closed at its rearward end by a face having a plurality of axially extending radially spaced lugs integrally formed thereon, any one of said lugs providing the sole coupling spring driving means. The spring has identical end-turned portions each of which are square with the spring axis and terminate in inwardly directed radial tangs so as to engage a slot in the driven disc and one of the lugs of the driving housing respectively, to provide a flexible torsional shaft coupling that is readily separable.

4 Claims, 11 Drawing Figures

U.S. Patent   Jan. 6, 1976   Sheet 1 of 2   3,930,380
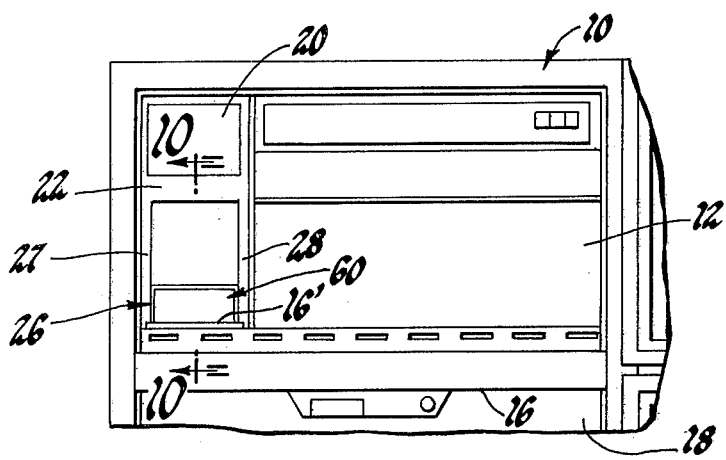
Fig. 1
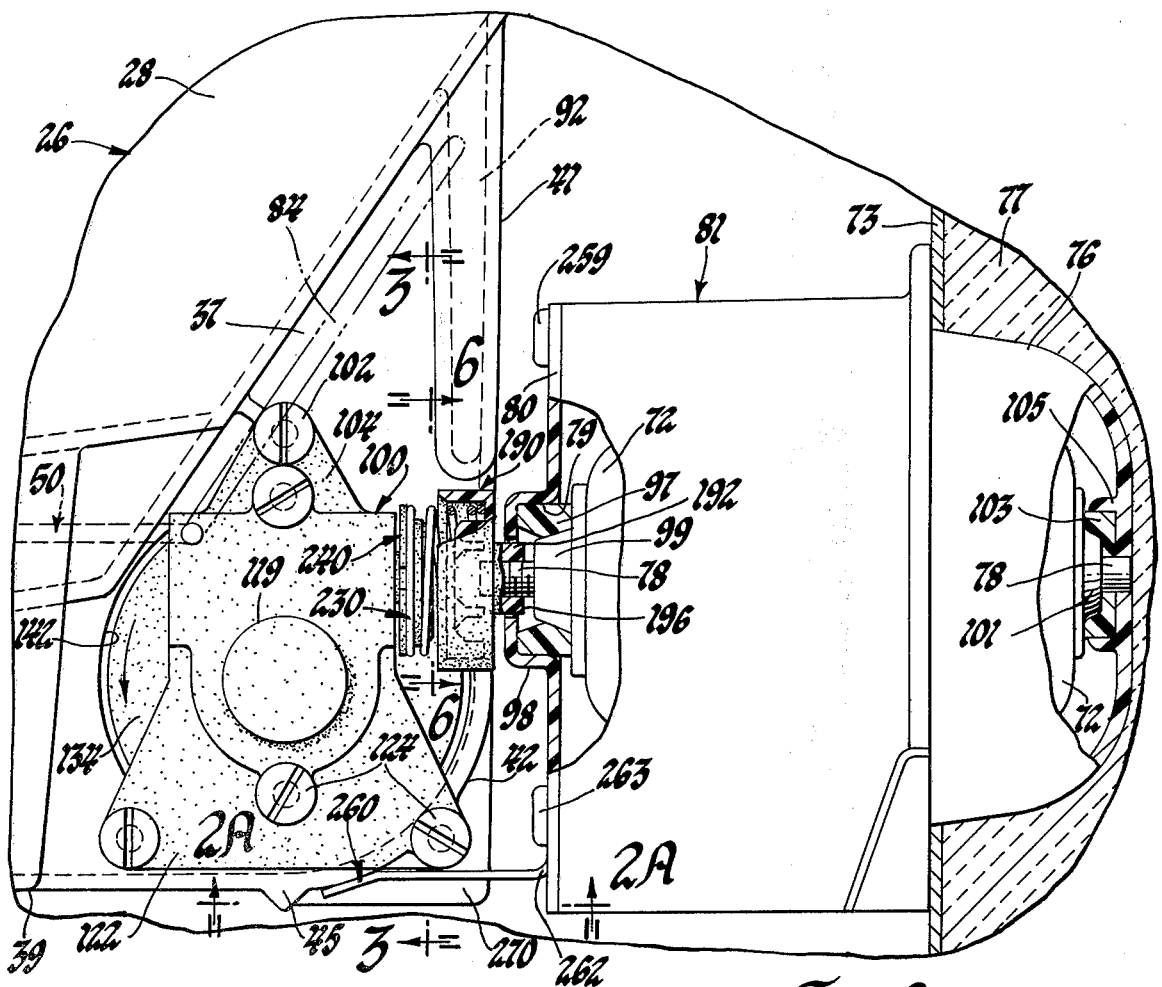
Fig. 2
Fig. 2A U.S. Patent   Jan. 6, 1976   Sheet 2 of 2   3,930,380

ICE DISPENSER CONTAINER COUPLING

This invention relates to self-aligning shaft couplings and more particularly to a readily releasable, resilient shaft coupling assembly between the drive motor and ice piece dispenser for use with a domestic refrigerator automatic ice maker.

One form of improved dispenser for an automatic ice maker for dispensing predetermined quantities of ice pieces exteriorly of a refrigerator cabinet in response to operator-initiated signals is disclosed in the Sucro et al U.S. Pat. application Ser. No. 420,361 now U.S. Pat. No. 3,887,119, owned by the assignee of the instant invention. In the Sucro application a ram, having a stepped upper surface, is longitudinally driven by an eccentric for combined oscillatory and reciprocal movement from a recessed trough of an ice piece storage bin. As it is obviously convenient to be able to either completely or partially remove the storage bin from the refrigerator freezer compartment for removing large quantities of ice pieces by sliding the bin outwardly from beneath the icemaker it will be appreciated that some form of releasable self-aligning coupling will be required between a bin driven shaft and a cabinet motor driving shaft.

Accordingly, it is an object of the present invention to provide an improved self-aligning shaft coupling having a flexible torsional coil spring which may be readily engaged even through the shafts are either in axial or offset misalignment.

It is another object of this invention to provide an improved self-aligning shaft coupling for a removable ice piece dispenser bin in which an open coil, helical spring is carried by means of a driven shaft mounted on the bin for releasable flexible torsional coupling with a tubular housing mounted on a driving shaft, wherein the housing has a cylindrical internal peripheral surface closed at its rearward end by a recessed face having a plurality of axially extending radial spaced lugs, any one of which provides the sole spring-driving means between the housing and the free radial tang end of the spring.

Further objects and advantages of the present invention will be apparent from the following description, reference being had to the accompanying drawings, wherein a preferred embodiment of the present invention is clearly shown.

In the Drawings:

FIG. 1 is a front elevational view of a removable ice dispensing bin positioned beneath an automatic icemaker incorporated in the freezer compartment of a top-freezer household refrigerator;

FIG. 2 is a fragmentary side elevational view, partly in section of the bin mounted driven portion for the ice dispenser and the driving shaft of the cabinet mounted electric motor;

FIG. 2A is a view taken on line 2A—2A of FIG. 2 showing the underside of the lead-in fork in engagement with the bin positioning rib;

FIG. 3 is a vertical sectional view taken on the line 3—3 of FIG. 2;

FIG. 4 is a horizontal sectional view of the driven shaft disc taken on line 4—4 of FIG. 3;

FIG. 5 is a plan view of the rearward face of the bin driven shaft disc taken on line 5 of FIG. 4;

FIG. 6 is a view of the forward open-ended coupling housing of the drive shaft and coupling and engaged helical spring taken substantially on the line 6—6 of FIG. 2;

FIG. 7 is a horizontal sectional view of the housing and spring taken on the line 7—7 of FIG. 6;

FIG. 8 is a vertical sectional view taken on the line 8—8 of FIG. 6;

FIG. 9 is an exploded view, in perspective, of the self-aligning shaft coupling shown in FIG. 2; and FIG. 10 is a fragmentary vertical sectional view taken on the line 10—10 of FIG. 1.

Referring now to the drawings and more particularly to FIG. 1, there is shown an upper cabinet portion 10 of a household refrigerator having a top freezer compartment 12 separated by a support shelf 16 from the lower fresh food storage compartment 18. An automatic liquid freezer or ice maker is shown installed in the area 20 above the space 22 from which ice pieces or frozen liquid are discharged into an ice collecting and dispensing bin 26 located therebelow. The automatic ice maker, while it could be of any one of numerous designs, is preferably of the type disclosed in U.S. Pat. No. 3,548,227 issued Nov. 17, 1970 to E. W. Eyman, Jr., et al, which patent is assigned to the assignee of the instant application.

The Eyman et al automatic icemaker is cycled such that after the liquid is frozen an ice tray or mold harvesting cycle is commenced wherein the tray is rotated to a substantially inverted position and twisted so as to release the ice pieces formed therein into the subjacent dispensing bin 26 which retains the ice pieces at below freezing temperatures prior to their being dispensed.

As described in the above-mentioned patent application S.N. 420,361, the ice storage bin 26, which is removably supported on the shelf 16, has a generally box-shaped configuration including vertical side walls 27 and 28. The base portion of the storage bin includes downwardly and inwardly converging bottom walls 29 and 30 (FIG. 3) intersecting side plates 36 and 37 respectively, of a longitudinally disposed bin trough 38. For a detailed description of the bin and ice dispensing mechanism, reference may be had to the above-mentioned Sucro et al patent application.

A longitudinal trough 38, illustrated in FIG. 3, is formed in the bottom of the bin which is closed on its under side by a bottom plate, partially indicated at 39 in FIG. 10, such that the plate 39 merges with the trough rear wall 41 via arcuate fillet 42, shown in FIG. 2. It will be noted that the bin side walls 27 and 28 terminate at their forward ends in bottom longitudinal edges 44 which together with a pair of skids 45 integrally molded at the aft portion of base plate 39, support the bin on shelf 16 when in the freezer compartment and on a work surface such as a kitchen countertop when removed from the refrigerator cabinet. It will be noted in FIG. 10 that the upper wall of the freezer shelf 16 has an integrally molded transverse rib 16' which engages the front baffle wall 65 to retain the bin in its exact longitudinal ice piece receiving position beneath the icemaker 20.

As seen in FIG. 10, the bin trough has positioned therein an elongated ram member 50 whose upper surface has a plurality of steps, one of which is shown at 55. The ram lead step 56 terminates in a downwardly and forwardly sloping ram front face 58 which is shown rearwardly spaced from a pivoted closure member in the form of a trap door 59 pivotally mounted at the entrance to an ice piece discharge housing member 60 having an ice piece discharge compartment 61 defined by an upper wall 62, side partitions, one of which is shown at 63, and a front baffle wall 65 forwardly offset from a front cover plate, partially shown at 66 having means to engage the bin front wall (not shown). The ram forward end 68 is movable along the trough longitudinal axis and the ram rearward end is drivingly connected to an eccentric to thereby impart combined reciprocating and oscillating travel to the ram.

To effect the combined reciprocating and oscillating movement of the ram 50 a linkage member is driven by eccentric drive means in the form of a fractional horsepower electric motor 72 as shown mounted on rear wall 73 of the freezer compartment so as to be partially received in a cup portion 76 recessed in the insulation material 77 of the rear wall area. The motor has its drive shaft 78 extending forwardly through an aperture 79 in the forward cover plate 80 of the plastic motor housing generally indicated at 81. It will be noted that front resilient bushing 97 is received in cylindrical cover pocket 98 so as to mount the bearing frusto-conical portions 99 of the motor. The rear portion of the motor shaft 78 and its embossment 101 are similarly mounted in rear resilient bushing 103 seated in cup boss 105 whereby the motor vibration is cushioned to a level that will not be detected by the customer.

As seen in FIG. 2, a reduction gear unit casing 100 is secured to the rear portion of the trough side plate 37 by machine screws 102 which extend through housing ears 104 and thence into integral boss portion 106. The driven coupling shaft 110 extends through the wall of the casing 100 of the reduction gear unit and engages in suitable bearing cups (not shown) located in the end walls of the casing 100. On the driven shaft 110 is a worm and worm gear arrangement (not shown) secured to a transverse shaft 118, having a concentric boss 119, with the shaft 118 extending through an opening in the opposite casing side wall 120 so as to be threadably received in the gear hub, while the gear cover plate 122 is retained thereon by screws 124. A driven wheel 134, integrally formed on the inner end of the transverse shaft 118, is rotated within a conforming circular opening 142 in the trough side plate 37 such that the drive wheel 134 has its inner surface 135 flush therewith. The drive wheel 134 has integrally molded thereon and extending normal thereto an eccentrically positioned link pin (not shown) adjacent the outer periphery of the drive wheel 134 for reception through a suitable pivotal connection with the lower portion of the linkage member 84 and the rear portion of the ram 50. The rearmost portion of the linkage member 84 includes transverse pins for sliding reception in opposed vertical bin grid slots 92 as fully set forth in the mentioned Sucro et al application.

The new and improved self-aligning shaft coupling assembly consists of first and second spaced annular members with the first coupling member 190 being a rearwardly positioned housing secured on the motor driven shaft 78 by means of a rearwardly extending hub portion 192 having an axial bore 194 threaded on the shaft 78 such that the hub is received in aperture 196 in the pocket 98 of the motor cover plate 80. The driving coupling means in the form of the housing or tubular sleeve collar 198 has a generally cylindrical internal peripheral surface 200 closed at its rearward end by a base plate 202 on whose rearward or outer face 204 the hub 192 is integrally formed.

The inner or forward face 206 of the base plate 202 has a forward axial stud portion 210 having its nose 212 tapered with a decreasing diameter toward the center providing a frusto-conical portion. Positioned symmetrically around the forward stud 210 are integrally molded cylindrical driving lugs located radially outward from the forward stud 210 which in the preferred form comprise four identical driving lugs 214, 215, 216 and 217 centered at each corner of a square so as to be arcuately spaced at 90° intervals around the hub. Each lug has a conical shaped or pointed tip as shown at 218 in FIG. 7 together with a radial flange or web portion 220 having a knife-like outer edge 222.

The tubular sleeve portion 198 of the driving coupling 190 includes a peripheral surface 224 outwardly tapered with an increasing diameter toward the outer surface to provide a smooth lead-in surface to the cylindrical internal peripheral surface 200 such that the open end entrance portion of the tubular sleeve 198 receives the free end of a cylindrical open coil helical compression spring 230 for reception on the inner face 206 of the base 202. As best seen in FIGS. 6, 7 and 8 of the illustrated embodiment of the invention, one of the lugs 214-217 in the housing 198 is designed to receive an extreme inwardly directed straight radial tang end portion 232 on the outer turn of the spring. The lugs are cylindrical so that the tangs 232 need not be formed perfectly radial to contact and drive on some point of the lug circumference.

The free end turn portion 231 of the spring, which has the same diameter as the remaining operating coils of the spring, is formed square with the longitudinal axis of the spring so that when the free end turn portion 231 is seated flush with the face 206 and the tang end 232 engages on of the lugs, such as lug 214 in FIG. 6, it provides the sole means for firmly positioning the spring in the housing. Since the tang 232 and end portion 231 of the spring are square with the axis of the spring and the free end turn portion is telescoped about or encircles all four lugs the free end portion 231 axially aligns the spring with the motor shaft 78. It will be noted that the free end portion 231 has a circumferential length of more than 270° in order that it will contact all four of the lugs 214-217. With reference to FIG. 6 it will be appreciated that each of the radial webs 220 provide reinforcement for the associated lugs 214-217 while allowing the tang portion 232, located on a radial line 219, to be positioned in spaced relation from the web and lug 214 to insure that a sharply cut tang end 238 will not contact the housing to cause possible scarring or other damage to the housing.

The forward second spaced annular spring anchoring disc member 240, mounted for rotation on the driven shaft 110 of the ice dispenser, is in the form of a flanged disc with a forward radially extending flange or rim portion 241 formed integrally to the disc portion. The disc 240 includes a central forwardly extending hub 242 provided with an axial bore 244 for threadable mounting on driven shaft 110. As seen in FIG. 4, the rearward periphery 246 of the disc 240 is tapered with a decreasing diameter toward the center of the disc to provide a lead-in periphery for receiving the fixed end of the helical compression spring 230.

As seen in FIG. 5, a radial slot 248 is formed in the outer surface 250 having a chamfered outer edge 251 to allow for the reception of an extreme tang portion 254 on the inner turn of the spring 230. The fixed end portion 253 of the spring, having the same diameter as the remaining operating coils, is formed square with the longitudinal axis of the spring in the same manner as spring free end 231 so that after the radial tang 254 is received in slot 248 the fixed end portion 253 is seated flush with the inner flange face 256 by being snapped over a friction detent 258 formed on the cylindrical periphery of the disc at a location diametrically opposite from the slot 248.

As seen in FIGS. 2 and 2A, the lower end of the cover plate 80, secured by screws 259 to motor housing 81, has initial bin guide means in the form of a bifurcated or fork-like member generally indicated at 260 having an L-shaped section whose upstanding flange 262 is secured by screw 263 to the cover plate 80. The forwardly extending legs 264 and 265 of the member 260 define longitudinal open-ended slot 266 having diagonally converging lead-in edges 268 and 269 for reception of the longitudinal rib 270 integral with the bottom plate 39 of bin trough 38. Thus, as the bin is inserted in the freezer compartment between its spaced side walls it will be guided such that the rib 270 is aligned to engage one of the lead-in edges 268, 269 so as to slip into slot 266 just before the free end of spring 230 approaches the housing 190. The final rearward travel of the bin will cause the spring free end to engage peripheral housing surface 224 whereby final positioning of the bin front baffle wall 65 behind the retaining rib 16' will seat the spring turn 231 against the face 206 of the housing 190. It will be seen that if the radial tang end 232 contacts one of the lugs 214-217 it will either be directed by its cone 218 to engage its associated lug, as shown in FIG. 6, or else move to the dashed line position of FIG. 6 such that the tang will engage the next succeeding lug when the housing is rotated in a counterclockwise direction by the motor shaft as indicated by the arrow.

As explained in the above-referenced Sucro et al application after the ice pieces are advanced through the trap door 59, which is spring biased closed by suitable spring means 70, by the ram 50, the ice pieces are free to fall by gravity through a passageway in partition 16, indicated at 272 in FIG. 10, into a connecting passage for dispensing into suitable means, such as a glass in an ice service area in the refrigerator door as shown and described in the U.S. Pat. No. 3,789,620 to L. D. Benasutti et al, which patent is assigned to the same assignee as the present application.

While the embodiment of the present invention as herein disclosed constitutes a preferred form, it is to be understood that other forms might be adopted.

I claim:

1. A flexible coupling unit for readily coupling and decoupling the driven shaft of an appliance, removably located on a support structure, and a motor driving shaft mounted on said support structure comprising, a driving tubular sleeve closed at one end by a base providing inner and outer faces, means for fixedly attaching said sleeve outer face on the end of said driving shaft, a disc fixed on the end of said appliance driven shaft in axially spaced opposed relation to said tubular sleeve inner face, an open helical coiled wire spring having one end fixed on said disc, said coiled spring having its end turns formed square with the longitudinal axis of said spring, said spring free end being telescoped within said tubular sleeve and compressed such that said free end turn is seated flush with said sleeve inner face upon said appliance being moved into its operative position on said structure, means for retaining the appliance in its operative position on said structure, said sleeve inner face having a plurality of axially extending, radially arranged driving lugs fixed thereon; said coil spring free end turn terminating in an inwardly directed radial tang, and said radial tang being located so as to engage one of the plurality of driving lugs in hook-like fashion upon rotation of said driving shaft in a first direction, whereby said helical coiled spring tends to tighten in said first direction causing said disk and driven shaft to be rotated in said first direction and operate said appliance.

2. A flexible readily detachable coupling unit for coupling the driven shaft of an ice piece dispensing container, removably located in a compartment of a domestic refrigerator, and a motor driving shaft mounted in said compartment comprising, a driving tubular sleeve closed at one end by a base providing inner and outer faces, means for fixedly attaching said sleeve outer face on the end of said driving shaft, a disc fixed on the end of said container driven shaft in axially spaced opposed relation to said tubular sleeve inner face, an open helical coiled wire spring having one end fixed on said disc, said coiled spring having its end turns formed square with the longitudinal axis of said spring, said spring free end being telescoped within said tubular sleeve and compressed such that said free end turn is seated flush with said sleeve inner face upon said container being moved into its ice dispensing operative position in the refrigerator compartment, means for retaining the container in its operative position, said sleeve inner face having a plurality of axially extending, arcuately spaced driving lugs fixed thereon; said coil spring free end turn terminating in an inwardly directed radial tang, and said radial tang being located so as to engage one of the plurality of driving lugs in hook-like fashion upon rotation of said driving shaft in a first direction, whereby said helical coiled spring tends to tighten in said first direction causing said disc and driven shaft to be rotated in said first direction in unison with said driving tubular sleeve and driven shaft operating said ice dispensing container.

3. A flexible self-aligning coupling unit for readily coupling and decoupling the driven shaft of an ice piece dispensing container, removably located in a freezer compartment of a domestic refrigerator, and a motor driving shaft mounted in said freezer compartment comprising, a driving housing closed at one end by a base providing inner and outer faces, the open end of said housing having a generally cylindrical internal peripheral surface, means for fixedly attaching said sleeve outer face on the end of said driving shaft, a disc fixed on the end of said container driven shaft in axially spaced opposed relation to said tubular sleeve inner face, an open helical coiled wire spring having one end fixed on said disc, said coiled spring having its end turns formed square with the longitudinal axis of said spring, a member defining a longitudinal open-ended guide slot located adjacent the rearward end of said compartment, a longitudinal rib on said container positioned to be received in said open-ended slot during the final rearward travel of said container, whereby said spring free end will be horizontally aligned with said housing open end for telescopic reception therein, said spring free end being telescoped within said tubular sleeve and compressed such that said free end turn is seated flush with said sleeve inner face upon said container being moved into its ice dispensing operative position in the refrigerator compartment, means for retaining the container in its operative position, said sleeve inner face having a plurality of axially extending, radially arranged and arcuately spaced driving lugs fixed thereon; and said coil spring free end turn terminating in an inwardly directed radial tang, said radial tang being located so as to engage one of the plurality of driving lugs in hook-like fashion upon rotation of said driving shaft in a first direction, whereby said helical coiled spring tends to tighten in said first direction causing said disc and driven shaft to be rotated in said first direction in unison with said driving housing and driving shaft operating said ice dispensing container.

4. A flexible self-aligning coupling unit for readily coupling and decoupling the driven shaft of an ice piece dispensing container removably located in a freezer compartment of a domestic refrigerator and a motor driving shaft mounted in said freezer compartment comprising, a driving housing closed at one end by a base providing inner and outer faces, the open end of said housing having a generally cylindrical internal peripheral surface, means for fixedly attaching said sleeve outer face on the end of said driving shaft, a radially flanged disc fixed on the end of said container driven shaft in axially spaced opposed relation to said tubular sleeve inner face, an open helical coiled wire spring having one end fixed on said disc, said coiled spring having its end turn portions formed square with the longitudinal axis of said spring to provide a circumferential length of at least 270°, said coil spring end turn portions terminating in inwardly directed radial tangs, said one end turn portion of said spring adapted to be slipped onto said disc for seating against said disc flange, radial slot means in said disc for reception of the radial tang of said one end turn portion, a friction detent formed on the cylindrical periphery of said disc diametrically opposite from said slot whereby said one end turn portion is snapped over said detent for retention thereby, an L-shaped bifurcated member defining a longitudinal open-ended slot located adjacent the rearward end of said compartment, longitudinal rib means on said container positioned to be received in said open-ended slot during the final rearward travel of said container, whereby said spring free end will be horizontally aligned with said housing open end cylindrical surface for telescopic reception therein, said spring free end being telescoped within said tubular sleeve and compressed such that said free end turn is seated flush with said sleeve inner face upon said container being moved into its ice dispensing operative position in the refrigerator compartment, means for retaining the container in its operative position, said sleeve inner face having two pairs of diametrically opposed ninety degree spaced, axially extending driving lugs integrally formed thereon; said coil spring free end turn radial tang being located so as to engage one of the plurality of driving lugs in hook-like fashion upon rotation of said driving shaft in a first direction, whereby said helical coiled spring tends to tighten in said first direction causing said disc and driven shaft to be rotated in said first direction and operate said ice dispensing container.

* * * * *